United States Patent [19]

Smith

[11] 3,905,263

[45] Sept. 16, 1975

[54] TABLE MOUNTING FOR PORTABLE POWER SAW

[76] Inventor: Roger W. Smith, 13120 Grandview Rd., Grandview, Mo. 64030

[22] Filed: Aug. 9, 1974

[21] Appl. No.: 496,050

[52] U.S. Cl............... 83/477.2; 144/1 E; 144/35 A
[51] Int. Cl.² .......................................... B27B 5/24
[58] Field of Search.............. 83/477.2, 477.1, 477; 144/1 R, 1 E, 1 F, 35 R, 35 A

[56] References Cited
UNITED STATES PATENTS

| | | | |
|---|---|---|---|
| 1,801,721 | 4/1931 | Caldwell | 83/477.2 |
| 2,980,152 | 4/1961 | Slavin | 83/477.2 |
| 3,060,979 | 10/1962 | Hanvin | 83/477.2 |
| 3,285,303 | 11/1966 | Kwiatkowski | 83/477.2 |

Primary Examiner—Donald R. Schran
Attorney, Agent, or Firm—D. A. N. Chase

[57] ABSTRACT

A hand-held circular saw is converted into a table saw by providing a quick-release mount and extended controls. The mount is on the underside of the top of a portable sawing table and secures the circular saw (in an inverted orientation) rigidly in place with its baseplate flush against the underside of the tabletop and with the saw blade projecting upwardly through a suitable clearance opening. The inner end of a control arm is releasably secured to the handle of the circular saw by a special clamping device, and the trigger switch on the handle is manually actuated by an operating mechanism on the arm having a control linkage that extends along the arm to the outer end portion thereof where it may be conveniently reached by the operator during use of the table saw apparatus.

10 Claims, 8 Drawing Figures

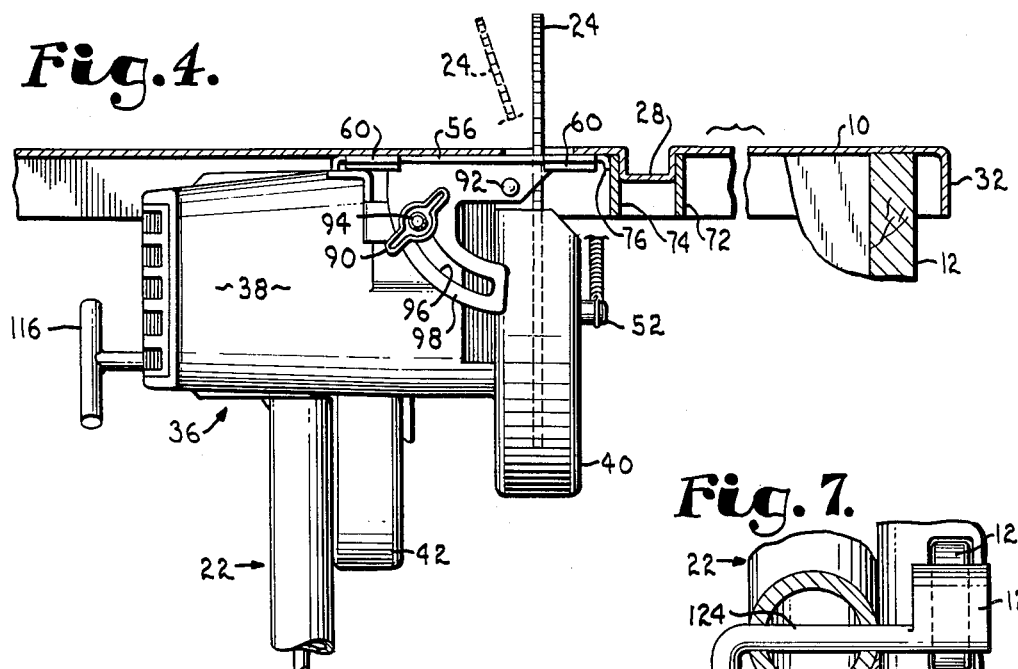
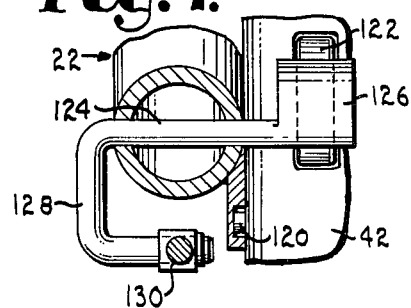
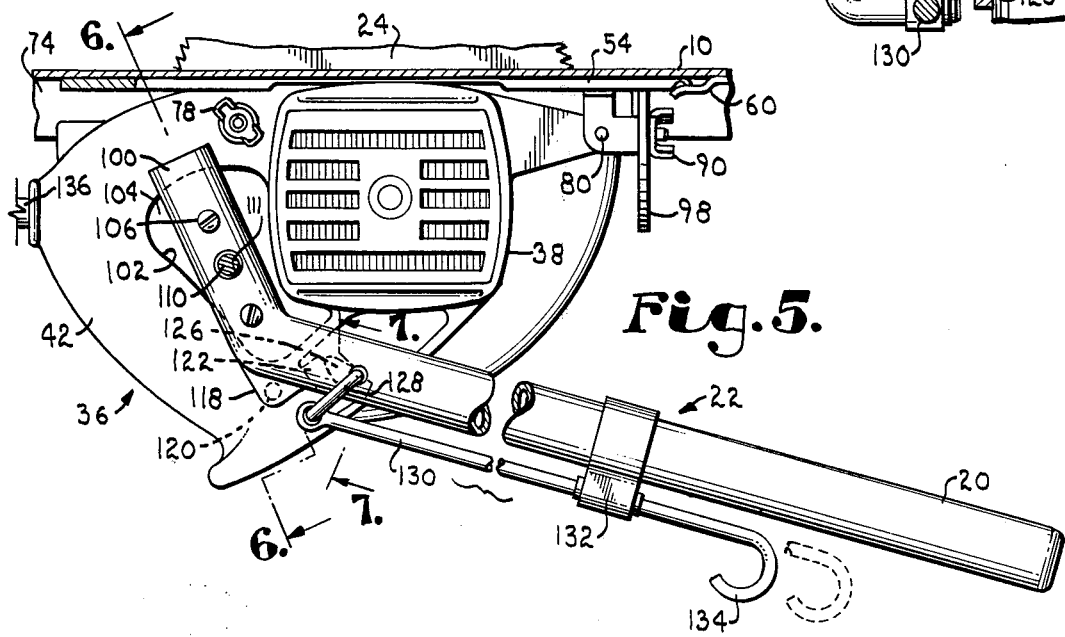
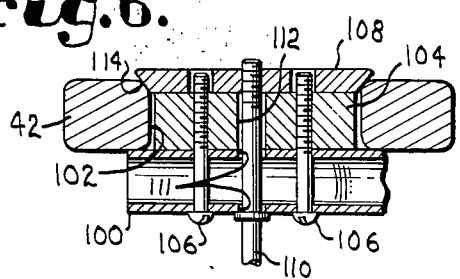

TABLE MOUNTING FOR PORTABLE POWER SAW

This invention relates to convertible saw apparatus wherein a power-operated, normally hand-held saw is employed as a portable table saw without structural modification, and wherein the table saw components may be rapidly disassembled to convert the apparatus back to a hand-held saw or for purposes of transportation from location to location.

A table saw is a valuable and very useful tool for both the hobbyist and for commercial applications, but it is usually characterized by a lack of convenient portability so that its use is restricted to a fixed shop location. Although hand-held power saws of various types are commercially available and are readily portable, they are not adequate substitutes for the speed, convenience and accuracy of a table saw for a number of common cutting jobs.

It is, therefore, an important object of the present invention to provide a portable table saw that may be readily transported from location to location, and quickly disassembled for transit and reassembled at the site.

Another important object of this invention is to provide a table saw as aforesaid which utilizes a hand-held power saw to provide both its blade and the drive for the blade, thereby taking advantage of available portable power saw units to simplify the construction of the table saw.

Still another important object of this invention is to provide a table saw which utilizes a portable power saw unit as aforesaid, wherein the apparatus is rapidly convertible to a table saw and also rapidly disassembled so that the portable saw unit may be used by hand in the conventional fashion if desired.

Furthermore, it is an important object of this invention to provide a special quick-release mount for facilitating the convertibility of the apparatus, plus extended controls that enable the blade to be conveniently adjusted and the motor switch actuated by the operator of the table saw during the sawing operation.

IN THE DRAWINGS

FIG. 4 is a front view of the apparatus shown in FIGS. 2 and 3, the tabletop being shown fragmentary and in cross-section;

FIG. 5 is a side elevation similar to FIG. 3 but viewed from the opposite side (the motor side);

FIG. 6 is a cross-sectional view taken along line 6—6 of FIG. 5;

FIG. 7 is an enlarged, fragmentary, cross-sectional view taken along line 7—7 of FIG. 5.

Figure 1:
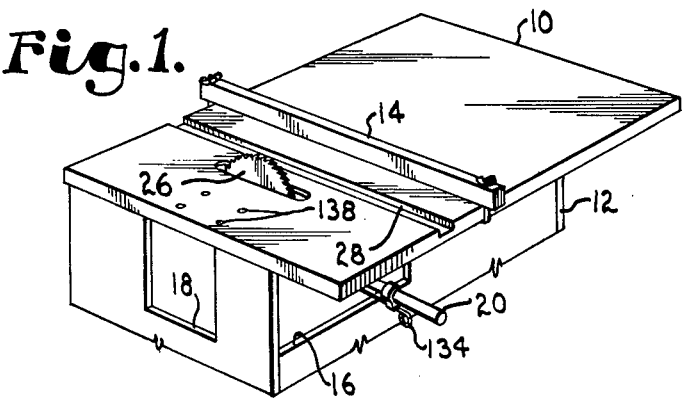
FIG. 1 is a perspective view of the table saw of the present invention, looking downwardly thereon from the front and one end of the table.

Referring initially to FIG. 1, the apparatus of the present invention is shown fully assembled as a table saw having a tabletop 10, a box base 12 supporting the tabletop 10, and a rip guide attachment 14 secured in place on the tabletop 10. The base 12 preferably comprises a front, a rear, and two end panels of plywood or similar material provided with access openings such as 16 and 18 in the front and end panels illustrated. The base 12 would normally not rest against the floor but would be of a shortened height to facilitate placement of the table saw apparatus on an existing table at the site or, for example, on a pair of spaced sawhorses (not shown). The tabletop 10 is preferably of heavy gauge sheet metal construction and may, for example, have a length of 27 inches and a width of 22 inches.

Figure 8:
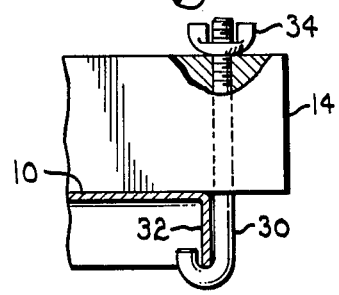
FIG. 8 is a detail view showing the manner in which the rip guide is secured to the tabletop.

The outer end portion 20 of a control arm 22 is shown in FIG. 1 extending outwardly through the access opening 16 where it may be conveniently gripped by the operator. The rotary blade 24 of the saw unit (to be described) projects upwardly through a clearance opening 26 in the tabletop 10 adjacent the usual crosscut guide 28. As is clear in FIG. 8, the rip guide or fence 14 is adjustably secured to the tabletop 10 by a J-hook 30 at each end of the guide which hooks over an integral depending flange 32 at the periphery of the tabletop 10. A wing nut 34 threaded on the shank of each J-hook 30 holds the same in tight engagement with the flange 32.

In FIGS. 2–5, it may be seen that the power saw unit broadly designated 36 is a conventional portable circular saw having a frame consisting of a motor housing 38, a fixed blade guard 40 and a handle 42 as basic components. The blade 24 is attached to the driven shaft 44 of the motor drive, the electric motor itself and the gear drive to the shaft 44 not being illustrated herein in detail. The particular unit 38 shown is a model 574, 7¼ inch power saw manufactured by Skil Corporation of Chicago, Ill., and sold under the trademark SKILSAW. A movable blade guard 46 is part of the saw unit 36 and is rotatable on the shaft 44, being biased in a counterclockwise direction as viewed in FIG. 3 by a spring 48. Since the presence of the guard 46 would interfere with operation of the table saw, a counterspring 50 is attached to a stud 52 on the guard 46 to maintain the guard in the position illustrated beneath and clear of the tabletop 10.

The saw unit 36 has a baseplate 54 of rectangular configuration which presents a pair of opposed end edges 56 and 58. A pair of spaced lugs 60 are welded on the underside of tabletop 10 and, as may be seen in FIG. 3, effectively define a horizontal slot 62 receiving the edge 56 of the baseplate 54. A metal strip 64 is also secured to the underside of tabletop 10 and extends in parallelism with the slot 62 defined by the lugs 60. When the edge 56 is inserted into the slot 62 with the baseplate 54 flush against the undersurface of the tabletop 10, the opposite edge 56 abuts the strip 64 and the latter serves as a retainer to hold the baseplate 54 in position. A swingable locking member in the nature of a flat bar 66 is mounted at one end by a pivot 68 to the retainer strip 64 and, in the operative position illustrated, engages the baseplate 54 to capture it between the bar 66 and the tabletop 10. To maximize the contact area of the flat bar 66 and its action as a locking lever, it may be noted that the pivot 68 is eccentric with respect to the major axis of the bar. A knob 70 on the outer end of the bar 66 is provided for the convenience of the operator in swinging the bar about the upright axis provided by the pivot 68 to the locked position illustrated.

Figure 2:
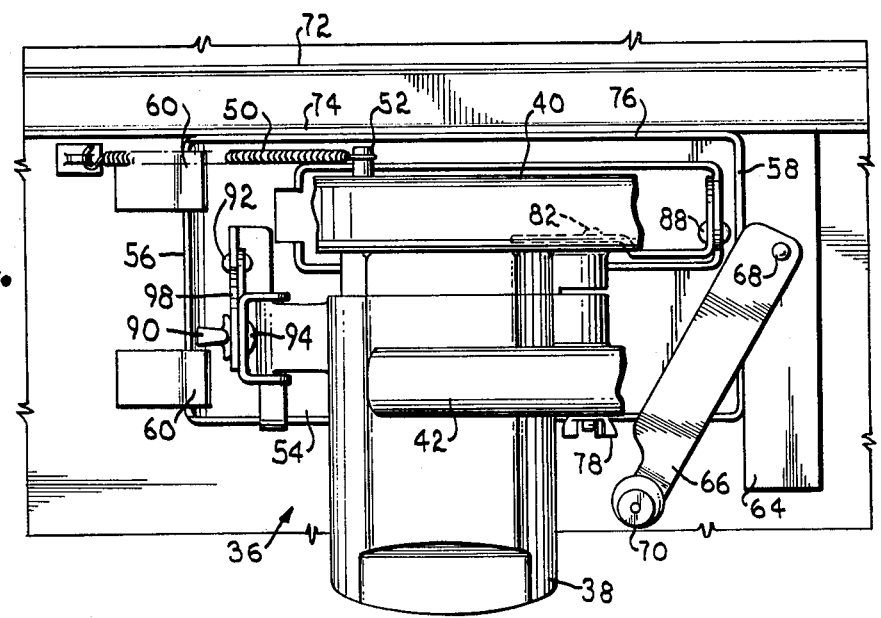
FIG. 2 is a fragmentary, enlarged, bottom plan view of the top of the table showing the underside thereof where the power saw unit is mounted, the fixed blade guard and the handle of the unit being broken away and the control arm of the invention removed for clarity.

In FIG. 2 a pair of closely spaced, parallel cross members 72 and 74 are illustrated and serve to reinforce the tabletop structure at the crosscut guide 28 (see FIG. 4). Also, the member 74 serves as an abutment to assist in proper positioning of the baseplate 54 of the saw unit 36, as it is engaged by the adjacent longitudinal edge 76 of the baseplate 54.

Figure 3:
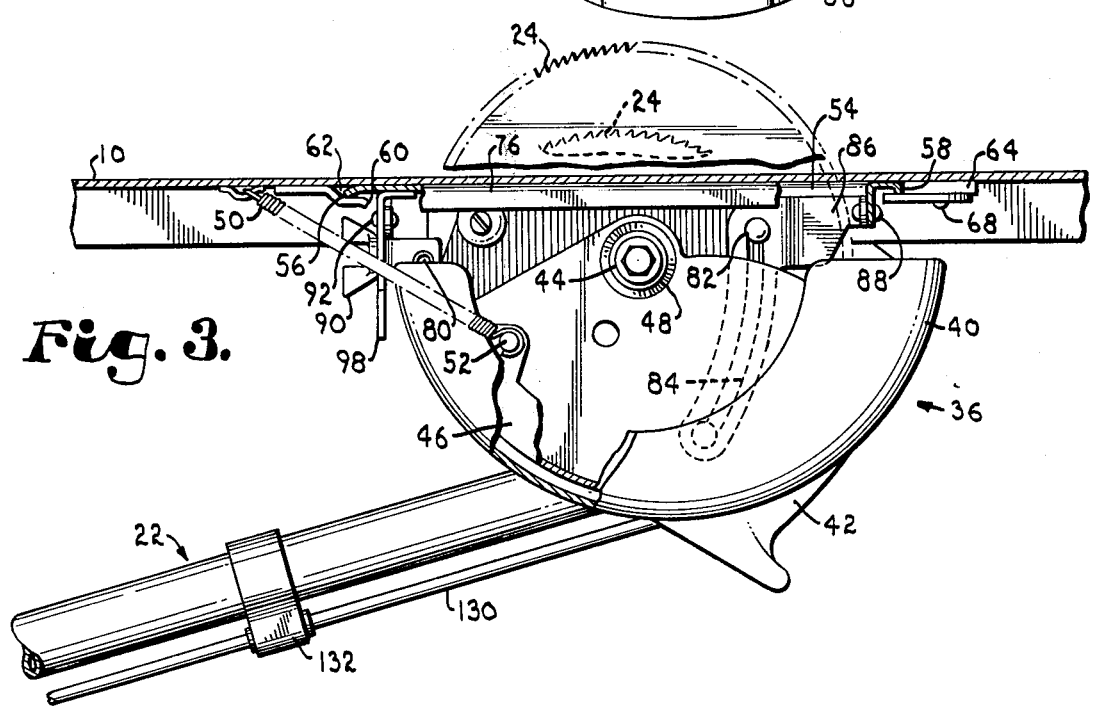
FIG. 3 is a side elevation of the power saw unit secured to the table as in FIG. 2 and illustrated on the same scale, the unit being viewed from the blade side with parts broken away and the tabletop broken away and shown in cross-section.

The vertical adjustability of the blade 24 is shown in FIG. 3 where the broken line illustration of blade 24 shows a reduction in blade height as compared with the full line illustration. This is accomplished by loosening the wing nut 78 on the handle 42 to permit the frame of the saw unit to pivot about the axis of a hinge pin 80. The wing nut 78 is threaded on the end of a bolt 82 whose head is visible in full lines in FIG. 3 and in broken lines in FIG. 2. An arcuate guide slot 84 is formed in an L-shaped finger 86 (FIG. 3) pinned at 88 to a depending tab integral with the baseplate 54. Accordingly, the bolt 82 rides in the slot 84 downwardly as the frame of the saw unit 36 pivots clockwise as viewed in FIG. 3 about the axis of hinge pin 80 to lower the blade 24.

Similarly, tilting of the saw blade 24 is illustrated in FIG. 4 by broken lines and is accomplished by loosening a wing nut 90 so that the frame of the saw unit can pivot about a horizontal axis defined by the pin 88 and a second pin 92. The wing nut 90 is threaded on a bolt 94 which rides in an arcuate guide slot 96 as the blade 24 is tilted, the slot 96 being formed in a depending plate element 98 rigid with the baseplate 54.

Referring to FIGS. 5–7, the control arm 22 of the present invention has an inner end 100 which is releasably secured to the handle 42 of the saw unit 36. The control arm 22 is preferably of tubular construction as illustrated and is straight except for the inner end 100 which is bent at approximately a 45° angle or slightly greater. It may be noted that the handle 42 defines an opening 102 for receiving the fingers of the hand when the unit 36 is detached from the table and used in the usual fashion as a hand-held power saw. This opening 102 is advantageously employed herein to facilitate the attachment of the control arm 22. A shaped component 104 is configured to substantially fill the opening 102 to provide a core therewithin, the component 104 being rigidly secured to the end 100 of control arm 22 by a pair of screws 106 that are received in mating, tapped openings in the component 104. A clamping plate 108 is drawn toward the inner end 100 by a draw bolt 110, the latter passing through aligned crossholes 111 in end 100 and being threadably received within a tapped opening in the clamping plate 108 (FIG. 6). A clearance passage 112 for the drawbolt 110 is provided in the component 104 and is aligned with the crossholes 111. The clamping plate 108 has a beveled edge 114 engaging the handle 42 around the opening 102, and the drawbolt 110 is preferably provided with a handgrip 116 (FIG. 4) so that the control arm 22 may be attached and removed without the use of tools.

An ear 118 formed on the control arm 22 bears against the trigger lock button 120 of the saw unit 36 in order to maintain the trigger 122 in a released condition so that it may be actuated at will. As is clear in FIG. 7, a shaft 124 extends through the control arm 22 and is rotatably received within aligned crossholes, the axis of the shaft 124 being at a right angle to the axis of the tubular control arm 22. A cam 126 is formed on the inner end of the shaft 124 and is located directly in front of the trigger 122, the opposite, outer end of the shaft 124 being bent at a right angle to form a crank 128 to which an operating rod 130 is secured. The rod 130 extends along the control arm 22 therebeneath and is supported by one or more guides 132, the outer end of the rod 130 being bent to form a loop 134 and located adjacent the outer end portion 20 of the control arm 22.

OPERATION

To assemble the table saw apparatus the edge 56 of the baseplate 54 is inserted into the slot 62, being guided by the crossmember 74 so that the blade 24 is properly aligned in the clearance opening 26 in the tabletop 10. Thus inserted, the opposite edge 58 of the baseplate 54 engages the retainer strip 64 and the locking bar 66 is swung inwardly to secure the saw unit 36 in place. A quick-release mount is thereby provided by the present invention in order to permit rapid installation and removal of the saw unit 36, and yet the unit is held rigidly in place with the baseplate 54 flush against the underside of the tabletop 10. The counterspring 50 is attached to the stud 52 to hold the movable blade guard 46 retracted.

Either before or after mounting the saw unit 36, as may be desired, the control arm 22 is connected to the handle 42 by placing its inner end 100 and the clamping plate 108 against opposite sides of the handle 42, as illustrated, and then inserting and tightening the drawbolt 110. This fixes the control arm 22 to the saw unit 36, a positive connection being formed by the joint action of the clamping device and the shaped component 104 which forms a core within the handle opening 102. Accordingly, the connection, though quickly releasable, has no lost motion or play.

Installation of the control arm 22 automatically positions the cam 126 against or closely adjacent the trigger 122. The line cord 136 (FIG. 5) is plugged into a convenience outlet, and the operator needs only to pull on the operating rod 130 to depress the trigger 122 and thereby close the motor switch (not shown). This action is illustrated in FIG. 5 by the broken line illustration of the loop 134 at the outer end of the rod 130; the loop 134 is provided so that the operator, with his hand on the outer end portion 20 of the control arm 22, may simply pull on the rod 130 with his index finger received within the loop 134. This causes the crank 128 to swing in a counter-clockwise direction as viewed in FIG. 5, thereby likewise rotating shaft 124 and cam 126 to depress the trigger 122. The trigger is restored to normal to shut off the motor by releasing the operating rod 130 which then returns to the off position illustrated in full lines under the action of the internal trigger spring (not shown) of the saw unit 36. An external return spring (not shown) may also be employed if desired.

Furthermore, the control arm 22 provides a means of adjusting the height and/or angularity of the saw blade 24 by loosening the wing nuts 78 or 90 (or both), manipulating the saw unit 36 with the control handle 22 until the desired blade position is obtained, and then retightening the wing nut or nuts involved.

It should also be appreciated that the present invention is readily adaptable to various types of commercially available portable power saws by simply locating the lugs 60 of the quick-release mount, shaping the core component 104, and sizing and positioning the clamping plate 108 and the cam 126 to accommodate the particular saw unit design. Furthermore, mounting holes such as illustrated at 138 in FIG. 1 may be provided at the end of the tabletop 110 above the access opening 18 to form a bench mount for the portable saw unit so it may be used for other power tool applications where a suitable mount is not available at the work site.

Having thus described the invention, what is claimed as new and desired to be secured by Letters Patent is:

1. Convertible saw apparatus comprising:
    a power-operated, normally hand-held saw having a baseplate, a rotary blade adjustable with respect to said baseplate, a drive for the blade, a handle, and an actuator on the handle for rendering the blade drive operational;
    portable table structure provided with a tabletop having a clearance opening therein for receiving said blade;
    a quick-release mount on the underside of said tabletop engageable with said baseplate for rigidly securing the baseplate to the tabletop with said blade extending upwardly through said opening, whereby the hand-held saw may be converted into a table saw;
    a control arm having opposed, inner and outer ends;
    releasable means connecting said inner end of the arm to said handle with the arm extending outwardly beneath said tabletop to locate the outer end portion thereof where it may be conveniently grasped by an operator for adjustment of the position of said blade; and
    manually operable mechanism on said arm engageable with said actuator for operating the latter when the arm is connected to said handle and having a control linkage extending along said arm to said outer end portion thereof, whereby to permit the operator to selectively control the operation of the blade drive when the apparatus is employed as a table saw.

2. The apparatus as claimed in claim 1, wherein said baseplate has a pair of opposed edges, and wherein said mount includes means defining a slot for receiving one of said edges with said baseplate flush against said underside of the tabletop, a retainer engageable with the opposite edge of said baseplate upon insertion of said one edge into said slot, and a locking device movable to and from an operative position capturing said baseplate between said device and said underside of the tabletop.

3. The apparatus as claimed in claim 2, wherein said locking device comprises a member pivotally mounted on said underside of the tabletop for swinging movement about an upright axis toward and away from said operative position where said member extends beneath said baseplate.

4. The apparatus as claimed in claim 1, wherein said handle defines an opening for receiving the fingers of an operator when gripped by hand, and wherein said releasable means includes a clamping device extending through said opening and engaging said handle.

5. The apparatus as claimed in claim 4, wherein said releasable means further includes a component rigidly secured to said arm, received within said handle opening and configured to present a core therewithin.

6. The apparatus as claimed in claim 5, wherein said handle has opposed sides, said inner end of the control arm engaging one side of said handle, and wherein said clamping device has a clamping plate engaging the opposite side of said handle and means drawing said plate and said inner end toward each other to sandwich said handle therebetween.

7. The apparatus as claimed in claim 1, wherein said mechanism includes a pivotal cam adjacent said actuator for operating the latter, and a crank connected with said cam and operated by said linkage.

8. Convertible saw apparatus comprising:
    a power-operated, normally hand-held saw having a baseplate provided with a pair of opposed edges, a rotary blade adjustable with respect to said baseplate, a drive for the blade, and a handle;
    portable table structure provided with a tabletop having a clearance opening therein for receiving said blade;
    a quick-release mount on the underside of said tabletop engageable with said baseplate for rigidly securing the baseplate to the tabletop with said blade extending upwardly through said opening, whereby the hand-held saw may be converted into a table saw,
    said mount including means defining a slot for receiving one of said edges of the baseplate with the latter flush against said underside of the tabletop, a retainer engageable with the opposite edge of said baseplate upon insertion of said one edge into said slot, and a locking device movable to and from an operative position capturing said baseplate between said device and said underside of the tabletop;
    a control arm having opposed, inner and outer ends;
    releasable means connecting said inner end of the arm to said handle with the arm extending outwardly beneath said tabletop to locate the outer end portion thereof where it may be conveniently grasped by an operator for adjustment of the position of said blade; and
    selectively operable means accessible to the operator and coupled with said drive for the blade for rendering the drive operational to thereby permit the operator to selectively control the blade when the apparatus is employed as a table saw.

9. The apparatus as claimed in claim 8, wherein said locking device comprises a member pivotally mounted on said underside of the tabletop for swinging movement about an upright axis toward and away from said operative position where said member extends beneath said baseplate.

10. The apparatus as claimed in claim 8, wherein said handle defines an opening for receiving the fingers of an operator when gripped by hand, and wherein said releasable means includes a clamping device extending through said opening and engaging said handle.

* * * * *